US012603089B2

(12) United States Patent
Kim et al.

(10) Patent No.: US 12,603,089 B2
(45) Date of Patent: Apr. 14, 2026

(54) ELECTRONIC APPARATUS PERFORMING SPEECH RECOGNITION AND METHOD FOR CONTROLLING THEREOF

(71) Applicant: SAMSUNG ELECTRONICS CO., LTD., Suwon-si (KR)

(72) Inventors: Saeyoung Kim, Suwon-si (KR);
Yongkook Kim, Suwon-si (KR);
Junghoe Kim, Suwon-si (KR);
Hyeontaek Lim, Suwon-si (KR);
Boseok Moon, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 213 days.

(21) Appl. No.: 18/384,607

(22) Filed: Oct. 27, 2023

(65) Prior Publication Data

US 2024/0096322 A1     Mar. 21, 2024

Related U.S. Application Data

(63) Continuation of application No. PCT/KR2023/013137, filed on Sep. 4, 2023.

(30) Foreign Application Priority Data

Sep. 15, 2022   (KR) ........................ 10-2022-0116473
Oct. 20, 2022   (KR) ........................ 10-2022-0135926

(51) Int. Cl.
*G10L 15/22*          (2006.01)
*G10L 15/187*         (2013.01)

(52) U.S. Cl.
CPC ............ *G10L 15/22* (2013.01); *G10L 15/187* (2013.01); *G10L 2015/223* (2013.01)

(58) Field of Classification Search
CPC . G10L 15/22; G10L 15/187; G10L 2015/223; G10L 15/1815; G10L 2015/228;
(Continued)

(56) References Cited

U.S. PATENT DOCUMENTS 9,775,113 B2     9/2017   Sun et al.
9,779,732 B2    10/2017   Lee et al.
(Continued)

FOREIGN PATENT DOCUMENTS

KR     10-2016-0010961 A     1/2016
KR     10-2016-0052727 A     5/2016
(Continued)

OTHER PUBLICATIONS

International Search Report and Written Opinion (PCT/ISA/210 and PCT/ISA/237) dated Dec. 6, 2023, issued by International Searching Authority for International Application No. PCT/KR2023/013137.
(Continued)

*Primary Examiner* — Vijay B Chawan
(74) *Attorney, Agent, or Firm* — Sughrue Mion, PLLC

(57)          ABSTRACT

Disclosed is an electronic apparatus which performs speech recognition. The apparatus includes: at least one sensor; a memory storing context data each corresponding to a plurality of commands; a microphone; and at least one processor configured to acquire a text corresponding to a voice command in case that the voice command is received through the microphone, identify context data corresponding to an identified command in case that a command having similarity of a first threshold value or more with the acquired text is identified among the plurality of commands stored in the memory, acquire a control signal corresponding to the identified command in case that current context data including context data acquired through the at least one sensor is
(Continued)

identified as having similarity of a second threshold value or more with the context data corresponding to the identified command, and perform an operation based on the control signal.

17 Claims, 13 Drawing Sheets

(58) Field of Classification Search
CPC ....... G10L 15/08; G10L 15/183; G10L 15/26; G10L 25/78; G10L 13/00; G10L 15/197; G06F 40/30
USPC .......................................................... 704/275
See application file for complete search history.

(56) References Cited

U.S. PATENT DOCUMENTS

| | | | |
|---|---|---|---|
| 9,842,588 | B2 | 12/2017 | Kim et al. |
| 9,858,925 | B2 | 1/2018 | Gruber et al. |
| 10,565,984 | B2 | 2/2020 | Sukhomlinov |
| 10,811,002 | B2 | 10/2020 | Cho et al. |
| 10,909,982 | B2 | 2/2021 | Kwon et al. |
| 10,997,973 | B2 | 5/2021 | Choi et al. |
| 11,158,308 | B1 | 10/2021 | Bissell et al. |
| 11,967,319 | B2 | 4/2024 | Anastasyev et al. |
| 11,972,339 | B2 | 4/2024 | Shah et al. |
| 12,011,828 | B2 | 6/2024 | Monceaux et al. |
| 2012/0265528 | A1 | 10/2012 | Gruber et al. |
| 2015/0221300 | A1 | 8/2015 | Sukhomlinov |
| 2016/0019887 | A1* | 1/2016 | Kim ...................... G10L 15/183 704/246 |
| 2016/0034133 | A1* | 2/2016 | Wilson ................. G04G 9/0076 715/772 |
| 2018/0041403 | A1* | 2/2018 | Rostaing ................. H04L 41/24 |
| 2018/0315427 | A1* | 11/2018 | Kwon ................. G10L 15/1815 |
| 2019/0318759 | A1 | 10/2019 | Doshi et al. |
| 2021/0193176 | A1* | 6/2021 | Doshi ..................... G10L 15/19 |
| 2021/0295833 | A1* | 9/2021 | Rastrow ............... G10L 15/222 |
| 2021/0327414 | A1 | 10/2021 | James et al. |
| 2021/0327421 | A1 | 10/2021 | Beaufays et al. |
| 2021/0335342 | A1 | 10/2021 | Yuan et al. |
| 2022/0180867 | A1* | 6/2022 | Bobbili .................. G10L 15/30 |
| 2024/0029743 | A1* | 1/2024 | Pasko ..................... G10L 17/26 |
| 2024/0096316 | A1* | 3/2024 | Henry ..................... G10L 15/08 |
| 2024/0096322 | A1* | 3/2024 | Kim ....................... G10L 15/187 |

FOREIGN PATENT DOCUMENTS

| | | |
|---|---|---|
| KR | 10-2018-0121758 A | 11/2018 |
| KR | 10-2021-0122755 A | 10/2021 |
| KR | 10-2022-0045741 A | 4/2022 |
| KR | 10-2022-0066735 A | 5/2022 |

OTHER PUBLICATIONS

Extended European Search Report issued Jun. 5, 2025 by the European Patent Office for EP Patent Application No. 23865772.0.

* cited by examiner

FIG. 4

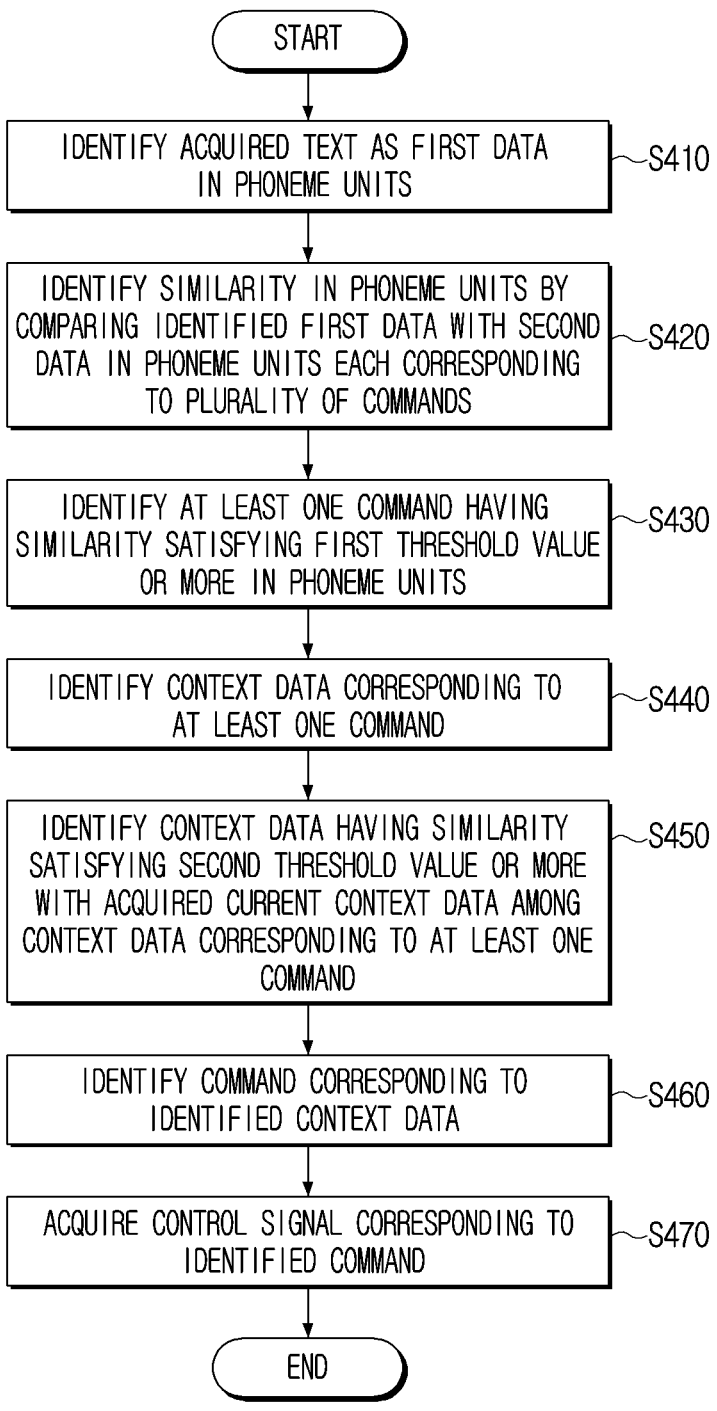

START

IDENTIFY ACQUIRED TEXT AS FIRST DATA
IN PHONEME UNITS ～S410

IDENTIFY SIMILARITY IN PHONEME UNITS BY
COMPARING IDENTIFIED FIRST DATA WITH SECOND
DATA IN PHONEME UNITS EACH CORRESPONDING
TO PLURALITY OF COMMANDS ～S420

IDENTIFY AT LEAST ONE COMMAND HAVING
SIMILARITY SATISFYING FIRST THRESHOLD VALUE
OR MORE IN PHONEME UNITS ～S430

IDENTIFY CONTEXT DATA CORRESPONDING TO
AT LEAST ONE COMMAND ～S440

IDENTIFY CONTEXT DATA HAVING SIMILARITY
SATISFYING SECOND THRESHOLD VALUE OR MORE
WITH ACQUIRED CURRENT CONTEXT DATA AMONG
CONTEXT DATA CORRESPONDING TO AT LEAST ONE
COMMAND ～S450

IDENTIFY COMMAND CORRESPONDING TO
IDENTIFIED CONTEXT DATA ～S460

ACQUIRE CONTROL SIGNAL CORRESPONDING TO
IDENTIFIED COMMAND ～S470

END

Figure 5:
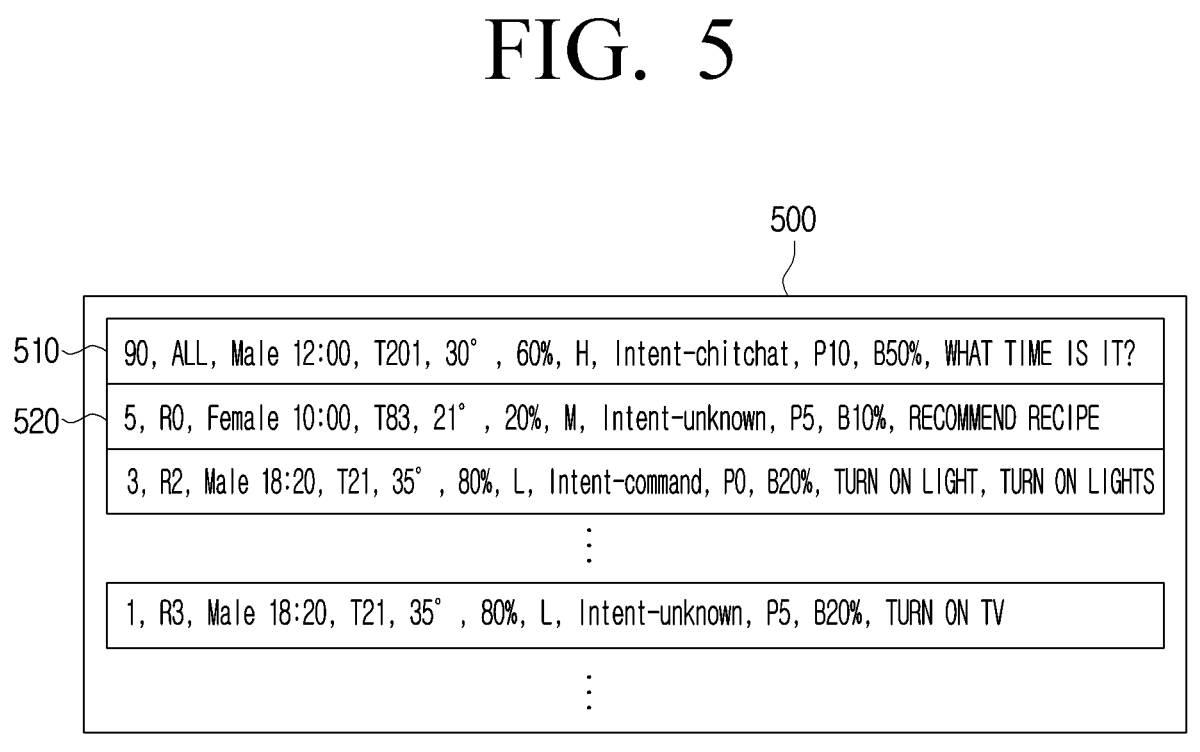

510 — 90, ALL, Male 12:00, T201, 30° , 60%, H, Intent-chitchat, P10, B50%, WHAT TIME IS IT?

520 — 5, R0, Female 10:00, T83, 21° , 20%, M, Intent-unknown, P5, B10%, RECOMMEND RECIPE 3, R2, Male 18:20, T21, 35° , 80%, L, Intent-command, P0, B20%, TURN ON LIGHT, TURN ON LIGHTS

⋮

1, R3, Male 18:20, T21, 35° , 80%, L, Intent-unknown, P5, B20%, TURN ON TV

⋮

710

WHAT TIME IS IT?

700

720 — 10, ALL, Male 2:00, T83, 21° , 20%, M, Intent-chitchat, P10, B50%, WHAT TIME IS IT?

730 — 90, ALL, Male 12:00, T201, 30° , 60%, H, Intent-unknown, P5, B50%, WHAT TIME IS IT?

5, R0, Female 10:00, T83, 21° , 20%, M, Intent-unknown, P5, B10%, RECOMMEND RECIPE 3, R2, Male 18:20, T21, 35° , 80%, L, Intent-command, P0, B20%, TURN ON LIGHT, TURN ON LIGHTS

⋮

1, R3, Male 18:20, T21, 35° , 80%, L, Intent-unknown, P5, B20%, TURN ON TV

⋮

ELECTRONIC APPARATUS PERFORMING SPEECH RECOGNITION AND METHOD FOR CONTROLLING THEREOF

CROSS-REFERENCE TO RELATED APPLICATION(S)

This application is a bypass continuation of International Application No. PCT/KR2023/013137, filed on Sep. 4, 2023, which is based on and claims priority to Korean Patent Application No. 10-2022-0116473, filed on Sep. 15, 2022, in the Korean Intellectual Property Office and Korean Patent Application No. 10-2022-0135926, filed on Oct. 20, 2022, in the Korean Intellectual Property Office, the disclosures of which are incorporated by reference herein in their entireties.

BACKGROUND

1. Field

Embodiments of the disclosure relate to an electronic apparatus performing speech recognition and a method for controlling the same, and more particularly, to an electronic apparatus performing speech recognition by using context data, and a method for controlling the same.

2. Description of Related Art

Various types of electronic apparatuses have been developed in accordance with the development of electronic technology and being widely used. In recent years, an electronic apparatus analyzing a user's voice using a speech recognition technology and providing a service to the user based on the analyzed voice has been actively developed.

In general, in order for the electronic apparatus to perform the speech recognition, a user needs to utter a voice including a call keyword (or a wake-up signal), and the electronic apparatus may then perform an operation for the speech recognition by recognizing the above-mentioned call keyword. However, even in a case where the user gives a simple command (for example, "turn on the TV" or "turn on the light") at home, the user needs to utter the call keyword followed by an utterance of the simple command, which may be inconvenient.

SUMMARY

According to an aspect of the disclosure, there is provided an electronic apparatus including: at least one sensor; a memory storing a plurality of context data each corresponding to one of a plurality of commands; a microphone; and at least one processor configured to: acquire text data corresponding to a voice command received through the microphone, identify a first command, among the plurality of commands, based on a comparison between the acquired text data and the plurality of commands, identify first context data, among the plurality of context data, corresponding to the identified first command, acquire a control signal corresponding to the identified first command based on a comparison between the first context data corresponding to the identified first command and second context data acquired through the at least one sensor corresponding to the voice command, and perform an operation based on the control signal.

According to another aspect of the disclosure, there is provided a method for controlling an electronic apparatus which performs speech recognition, the method including: acquiring text data corresponding to a voice command; identifying a first command, among a plurality of commands, based on a comparison between the acquired text data and the plurality of commands; identifying first context data, among a plurality of context data, corresponding to the identified first command, each of the plurality of context corresponding to one of a plurality of commands; acquiring a control signal corresponding to the identified first command based on a comparison between the first context data corresponding to the identified first command and second context data acquired through at least one sensor corresponding to the voice command; and performing an operation based on the control signal.

BRIEF DESCRIPTION OF THE DRAWINGS

FIG. 4 is a flowchart for explaining a method of acquiring a control signal corresponding to a command according to one or more embodiments.

FIG. 5 is a diagram for explaining a command and context data according to one or more embodiments.

DETAILED DESCRIPTION

Hereinafter, the disclosure is described in detail with reference to the accompanying drawings.

Terms used in the specification are briefly described, and the disclosure is then described in detail.

General terms that are currently widely used are selected as the terms used in embodiments of the disclosure in consideration of their functions in the disclosure, and may be changed based on the intention of those skilled in the art or a judicial precedent, the emergence of a new technique, or the like. In addition, in a specific case, terms arbitrarily chosen by an applicant may exist. In this case, the meanings of such terms are mentioned in detail in corresponding descriptions of the disclosure. Therefore, the terms used in the embodiments of the disclosure need to be defined on the basis of the meanings of the terms and the contents throughout the disclosure rather than simple names of the terms.

In the disclosure, an expression "have", "may have", "include", "may include" or the like, indicates the existence of a corresponding feature (for example, a numerical value, a function, an operation or a component such as a part), and does not exclude the existence of an additional feature.

An expression, "at least one of A or/and B" may indicate either "A or B", or "both of A and B."

Expressions "first", "second", and the like, used in the disclosure may indicate various components regardless of the sequence or importance of the components. These expressions are used only to distinguish one component from another component, and do not limit the corresponding components.

In case that any component (for example, a first component) is mentioned to be "(operatively or communicatively) coupled with/to" or "connected to" another component (for example, a second component), it is to be understood that any component may be directly coupled to another component or may be coupled to another component through still another component (for example, a third component).

A term of a singular number may include its plural number unless explicitly indicated otherwise in the context. It is to be understood that a term "include", "formed of", or the like used in the application specifies the presence of features, numerals, steps, operations, components, parts, or combinations thereof, mentioned in the specification, and does not preclude the presence or addition of one or more other features, numerals, steps, operations, components, parts, or combinations thereof.

In the embodiments, a "module", a "unit", an "interface" or a "~er/~or" may perform at least one function or operation, and be implemented by hardware or software or be implemented by a combination of hardware and software. In addition, a plurality of "modules" or a plurality of "~ers/~ors" may be integrated in at least one module and implemented by at least one processor (not shown) except for a "module" or a "~er/or" that needs to be implemented by specific hardware.

Figure 1:
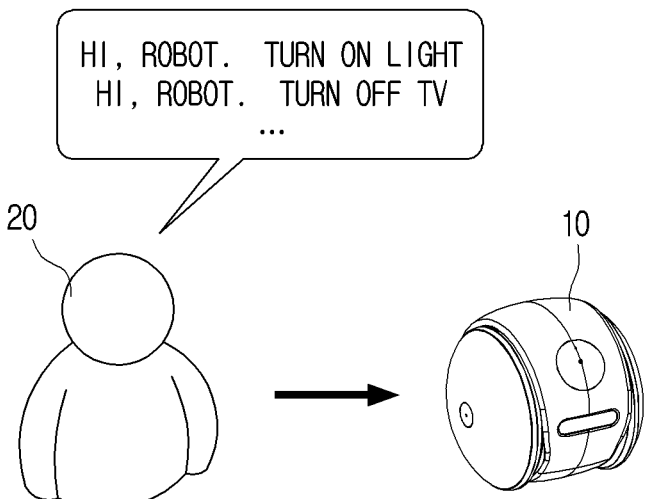
FIG. 1 is a diagram for explaining a method for controlling an electronic apparatus according to one or more embodiments.

FIG. 1 is a diagram for explaining a method for controlling an electronic apparatus according to one or more embodiments.

Referring to FIG. 1, an electronic apparatus 10 according to one or more embodiments may perform an operation corresponding to a voice command received from a user 20. For example, in case the user 20 utters a voice command, the electronic apparatus 10 may perform an operation corresponding to the voice command uttered by the user 20.

Here, according to one or more embodiments, the electronic apparatus 10 may be implemented in a different types of electronic apparatus, which may perform speech recognition. For example, the electronic apparatus 10 may be implemented as a mobile robot and travel in a driving space. However, the disclosure is not limited thereto, and the electronic apparatus 10 may be implemented, for example, in various apparatuses such as a smart television (TV), a tablet personal computer (PC), a monitor, a smartphone, a desktop computer, and a laptop computer. The electronic apparatus 100 according to one or more embodiments of the disclosure is not limited to the above-mentioned apparatuses, and the electronic apparatus 100 may be implemented as the electronic apparatus 100 having two or more functions of the above-mentioned apparatuses.

According to one or more embodiments, the electronic apparatus 10 may receive a voice command from the user 20. For example, the voice command may be a phrase: "Hi, robot. Turn on the light". In case that the voice command including a call keyword "Hi, robot" is received, the electronic apparatus 10 may operate a speech recognition mode of the electronic apparatus 10 based on the call keyword, and may perform an operation corresponding to the received voice command.

Meanwhile, in case of a specific context, the user 20 may repeatedly input the same user command to the electronic apparatus 10. For example, the electronic apparatus 10 may repeatedly receive a voice command corresponding to "Turn on the TV" at 8:00 PM. In another example, the electronic apparatus 10 may repeatedly receive a voice command corresponding to "Turn off the light" at 11:00 PM. In yet another example, the electronic apparatus 10 may repeatedly receive a voice command corresponding to "Recommend the recipe" when the electronic apparatus 10 is located at a kitchen in a home. Even in a case in which a simple voice command is received as in the above example, the electronic apparatus 10 may perform a corresponding operation only when the call keyword is received. As such, it may be inconvenient for the user to repeat input of the call keywords one by one even in case of requesting such a simple command.

Accordingly, hereinafter the disclosure provides various embodiments of performing a corresponding operation by using the electronic apparatus and context data of the user in case that the voice command is received even though no separate call keyword is input.

Figure 2:
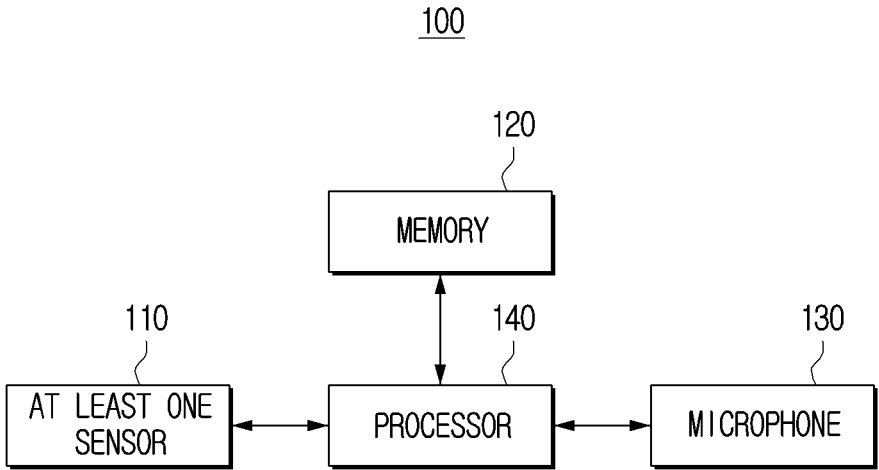
FIG. 2 is a block diagram showing a configuration of an electronic apparatus according to one or more embodiments.

FIG. 2 is a block diagram showing a configuration of the electronic apparatus according to one or more embodiments.

Referring to FIG. 2, the electronic apparatus 100 may include at least one sensor 110, a memory 120, a microphone 130, and at least one processor 140.

At least one sensor 110 (hereinafter referred to as a sensor) may include a plurality of sensors of various types. The sensor 110 may measure a physical quantity or detect an operation state of the electronic apparatus 100, and convert the measured or detected information into an electrical signal. The sensor 110 may include a camera, and the camera may include a lens that focuses visible light and other optical signals received after being reflected by an object to an image sensor, and the image sensor which may detect visible light and other optical signals. Here, the image sensor may include a two-dimensional (2D) pixel array divided into a plurality of pixels.

According to one or more embodiments, the camera may be implemented as a depth camera. In addition, according to one or more embodiments, the sensor 110 may include a thermal image sensor that reads a shape as well as a distance sensor such as a light detection and ranging (LiDAR) sensor or a time of flight (TOF) sensor.

According to one or more embodiments, the sensor 110 may detect the operation state of the electronic apparatus 100 and/or an external environment state of the electronic apparatus 100. For example, the sensor 110 may include one or more sensors configured to detect the operation state (e.g., power or temperature) of the electronic apparatus 100 and/or the external environment state (e.g., ambient temperature, humidity, or user state) of the electronic apparatus 100. According to one or more embodiments, the sensor 110 may include at least one of a temperature sensor capable of acquiring temperature data, a humidity sensor capable of acquiring humidity data, a gesture sensor, a gyro sensor, a pressure sensor, a proximity sensor, a bio sensor, an illuminance sensor, and a fine dust sensor capable of calculating concentration of fine dust around the electronic apparatus 100. In addition, according to one or more embodiments, the sensor 110 may include a motion sensor detecting motion of the electronic apparatus 100.

According to an embodiment, the memory 120 may store data. For example, the memory 120 may store data necessary for the electronic apparatus 100 according to various embodiments of the disclosure. The memory 120 may be implemented in the form of a memory embedded in the electronic apparatus 100, or may be implemented in the form of a memory detachable from the electronic apparatus 100, based on a data storing purpose. For example, data for driving the electronic apparatus 100 may be stored in the memory embedded in the electronic apparatus 100, and data for an extension function of the electronic apparatus 100 may be stored in the memory detachable from the electronic apparatus 100.

According to an embodiment, the memory embedded in the electronic apparatus 100 may be implemented as at least one of a volatile memory (for example, a dynamic random access memory (DRAM), a static RAM (SRAM), or a synchronous dynamic RAM (SDRAM)), a non-volatile memory (for example, an one time programmable read only memory (OTPROM), a programmable ROM (PROM), an erasable and programmable ROM (EPROM), an electrically erasable and programmable ROM (EEPROM), a mask ROM, or a flash ROM), a flash memory (for example, a NAND flash or a NOR flash), a hard drive, or a solid state drive (SSD)). In addition, the memory detachable from the electronic apparatus 100 may be implemented in the form of a memory card (for example, a compact flash (CF), a secure digital (SD), a micro secure digital (Micro-SD), a mini secure digital (Mini-SD), an extreme digital (xD), or a multi-media card (MMC)), or an external memory which may be connected to a universal serial bus (USB) port (for example, a USB memory).

According to one or more embodiments, the memory 120 may store context data corresponding to a plurality of commands. According to an embodiment, the memory 120 may store a plurality of context data, each corresponding to one of the plurality of commands. That is, each of the plurality of commands may be associated with corresponding context data in the memory 120. For example, a first command, among the plurality of commands, may be associated with first context data stored in the memory 120, and a second command, among the plurality of commands may be associated with second context data stored in the memory 120. Here, the command may indicate data for text corresponding to a request (or intent) of the user, and the request of the user may indicate a command requesting execution of a specific service. For example, the user may input "Turn on the TV." In this case, the command may be a text corresponding to "Turn on the TV", and the request of the user that corresponds to "Turn on the TV" may be a control command to turn on a television (TV) among one or more electronic apparatuses. However, such classification is an example, and may be implemented in various ways based on a system implementation method.

According to one or more embodiments, the context data may include not only context data of the electronic apparatus 100 but also context data of the user. This configuration is described in detail with reference to FIG. 5.

According to one or more embodiments, the microphone 130 may indicate a module that acquires audio and converts the audio into an electrical signal. For example, the microphone 130 may be a condenser microphone, a ribbon micro-phone, a moving coil microphone, a piezoelectric element microphone, a carbon microphone, or a micro electro mechanical system (MEMS) microphone. In addition, the microphone may be implemented using an omni-directional method, a bi-directional method, a uni-directional method, a sub-cardioid method, a super-cardioid method, or a hyper-cardioid method.

According to one or more embodiments, the microphone 130 may receive a voice command. According to one or more embodiments, the microphone 130 may acquire audio corresponding to a voice command and convert the same into an audio signal.

According to one or more embodiments, the processor 140 may be electrically connected to the sensor 110, the memory 120, and the microphone 130 to control an overall operation of the electronic apparatus 100. The processor 140 may include one or more processors. In detail, the processor 140 may perform an operation of the electronic apparatus 100 according to the various embodiments of the disclosure by executing at least one command stored in the memory 120.

According to one or more embodiments, the processor 140 may be implemented as a digital signal processor (DSP) processing a digital video signal, a microprocessor, a graphics processing unit (GPU), an artificial intelligence (AI) processor, or a neural processing unit (NPU), or a timing controller (T-CON). However, the disclosure is not limited thereto, and the processor may include at least one of a central processing unit (CPU), a micro controller unit (MCU), a micro processing unit (MPU), a controller, an application processor (AP), a communication processor (CP), or an advanced RISC machine (ARM) processor, or may be defined by this term. In addition, the processor 140 may be implemented in a system-on-chip (SoC) or a large scale integration (LSI) in which a processing algorithm is embedded, or may be implemented in the form of an application specific integrated circuit (ASIC) or a field programmable gate array (FPGA).

According to one or more embodiments, the processor 140 may be implemented as the digital signal processor (DSP), the microprocessor, or the time controller (T-CON). However, the disclosure is not limited thereto, and the processor may include at least one of the central processing unit (CPU), the micro controller unit (MCU), the micro processing unit (MPU), the controller, the application processor (AP), the communication processor (CP), or the advanced RISC machine (ARM) processor, or may be defined by this term. In addition, the processor 140 may be implemented in the system-on-chip (SoC) or the large scale integration (LSI) in which the processing algorithm is embedded, or may be implemented in the form of the field programmable gate array (FPGA).

According to one or more embodiments, the processor 140 may acquire a text corresponding to a voice command. According to one or more embodiments, the processor 140 may acquire the text corresponding to the received voice command when the voice command is received through the microphone 130. For example, in case that the voice command corresponding to "turn on the light" is received from the user through the microphone 130, the processor 140 may acquire the text corresponding to the received "turn on the lights."

According to one or more embodiments, the processor 140 may identify the command based on the acquired text. According to one or more embodiments, the processor 140 may identify whether the acquired text is similar to any of the plurality of commands stored in the memory 120.

According to one or more embodiments, the processor 140 may identify whether a command, among the plurality of commands, having similarity satisfying a first threshold value or more with the acquired text exists. For example, in a case, in which, a text (acquired text) corresponding to "turn on the light" is received, the processor 140 may compare the acquired text with texts corresponding to the plurality of commands stored in the memory 120 and acquire similarities between the acquired text and the texts based on the comparison. The processor 140 may then identify at least one command having the similarity satisfying a first threshold value or more among the similarities between the acquired text and the texts corresponding to each of the plurality of commands.

According to one or more embodiments, the similarity between the acquired text and the texts responding to the plurality of commands stored in the memory 120 may be similarity between phonemes included in each of the acquired text and the texts responding to the plurality of commands stored in the memory 120. For example, the processor 140 may identify the acquired text and the plurality of commands by phoneme units, and compare phonemes in the acquired text with phonemes in the texts corresponding to the plurality of commands stored in the memory 120. The processor 140 may calculate the similarity of each of the plurality of commands with the acquired text based on a ratio of the number of phonemes that match the phonemes in the acquired text among the phonemes included in the respective command. According to one or more embodiments, this configuration is described in detail with reference to FIG. 4.

According to one or more embodiments, the processor 140 may identify context data corresponding to the identified command based on the data stored in the memory 120.

According to one or more embodiments, the context data may include position data of the electronic apparatus 100, state data of the electronic apparatus 100, environment data of the electronic apparatus 100, or the context data of the user. Accordingly, different types of context data, each corresponding to the plurality of commands may be stored in the memory. In case that any one of the plurality of commands is identified, the processor 140 may identify the context data corresponding to the identified command based on the data stored in the memory 120. According to one or more embodiments, this configuration is described in detail with reference to FIG. 5.

According to one or more embodiments, the processor 140 may acquire current context data. Here, according to one or more embodiments, the current context data may be the context data at time when the voice command is received. For example, the context data may include, but is not limited to utterance time of the user. Meanwhile, according to one or more embodiments, the processor 140 may acquire the current context data through at least one sensor 110. However, the disclosure is not limited thereto, and as such, the processor 140 may acquire the current context data based on the received voice command. That is, the current context data may include context data acquired through at least one sensor 110, and context data acquired based on the received voice command.

According to one or more embodiments, the electronic apparatus 100 may be implemented as a robot driving in the driving space or a driven area. In this case, the processor 140 may acquire data on the position of the electronic apparatus 100 in the driving space through the motion sensor or a global positioning system (GPS) sensor. Alternatively, the processor 140 may acquire the state data of the electronic apparatus 100 through at least one sensor 110, for example, data on remaining battery power of the electronic apparatus 100. Alternatively, according to one or more embodiments, the processor 140 may acquire the environmental data of the electronic apparatus 100 through at least one sensor 110. For example, the processor 140 may acquire data on at least one of temperature, humidity, illumination, fine dust concentration, or current time. Alternatively, according to one or more embodiments, the processor 140 may acquire the context data of the user, for example, gender data of the user or position data of the user. This configuration is described in detail with reference to FIG. 5.

According to one or more embodiments, the processor 140 may identify similarity between the acquired current context data and the context data corresponding to the identified command.

According to one or more embodiments, in case that at least one of the position data, state data, or environment data of the acquired electronic apparatus 100 or the context data of the user is acquired, the processor 140 may compare a plurality of data of different types included in the acquired context data with each of a plurality of data of different types included in the context data corresponding to the identified command for each corresponding type, and acquire the similarity of the context data corresponding to the identified command based on the comparison. Here, a type included in the context data may be, for example, the position, state, or environment of the electronic apparatus 100, or a context of a user, but is not limited thereto. A method of acquiring the similarity of the context data is described in detail with reference to FIG. 6.

According to one or more embodiments, the processor 140 may acquire a control signal corresponding to the identified command based on the identified similarity, and perform an operation based on the identified command.

According to one or more embodiments, the processor 140 may compare the context data (referred to as "current context data") acquired through the sensor 110 and the context data (referred to as "command context data") corresponding to the identified command from the memory 120 for each type, and acquire the similarity between the current context data and the command context data corresponding to the identified command. In case that the similarity between the current context data and command context data corresponding to the identified command satisfies a second threshold value or more, the processor 140 may acquire the control signal corresponding to the identified command and perform the operation corresponding the control signal.

Figure 3:
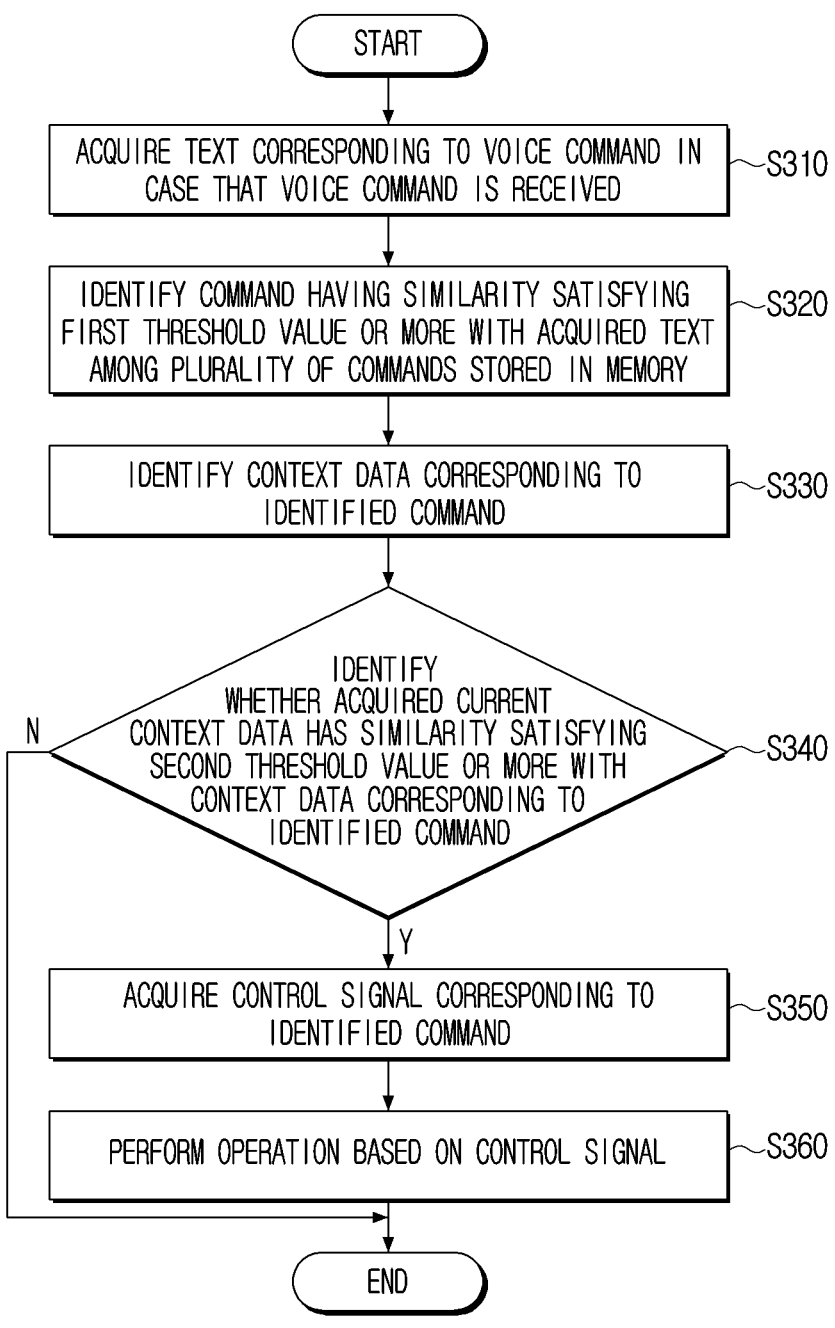
FIG. 3 is a flowchart for explaining a method for controlling an electronic apparatus according to one or more embodiments.

FIG. 3 is a flowchart for explaining a method for controlling an electronic apparatus according to one or more embodiments.

According to FIG. 3, the method may include acquiring a text corresponding to a voice command is received (S310). For example, in a case, in which, a voice command corresponding to a phrase "What time is it?" is received as a voice command without including a separate call keyword (or a wake-up sound) from a user through the microphone 130, the processor 140 may acquire a text corresponding to the phrase "What time is it?".

Next, according to one or more embodiments, the method may include identifying a command, among the plurality of commands stored in the memory 120, having a similarity with the acquired text satisfying a first threshold value or more (S320). According to one or more embodiments, the processor 140 may acquire a plurality of similarities (e.g., a plurality of similarity values), each corresponding to the plurality of commands. For example, each of the plurality of similarity values may be acquired by comparing the acquired text corresponding to the phrase "What time is it?" with a stored text corresponding to each of the plurality of commands stored in the memory 120. Next, the processor 140 may identify the text corresponding to "What time is it?" and "What time is it?", which is a command having the similarity of the first critical value or more, from each other based on the acquired similarity.

Next, according to one or more embodiments, the method may include identifying context data corresponding to the identified command (S330). According to one or more embodiments, the processor 140 may identify the context data corresponding to the identified command "What time is it?" based on data stored in the memory 120.

For example, the context data corresponding to the identified command may be the context data of the electronic apparatus 100 and/or the context data of the user at time in which the voice command corresponding to "What time is it?" is previously received from the user. That is, the commands stored in the memory 120 and the context data corresponding the stored commands may be history data for commands and contexts, previously acquired from the user. The context data corresponding the stored commands may be referred to as "stored context data". A method of updating the data stored in the memory 120 based on such a user history is described in detail with reference to FIGS. 9 and 10.

Next, according to one or more embodiments, the method may include identifying whether the current context data corresponding to the received voice command is similar to the stored context data corresponding to the identified command (S340). For example, the method may include identifying whether a similarity (e.g., a similarity value) between the current context data and the stored context data satisfies a second threshold value or more. That is, the method may include identifying whether the similarity value based on a comparison between the current context data and the stored context data is equal to or greater than the second threshold value. According to one or more embodiments, the processor 140 may compare a plurality of data of different types included in context data acquired through the sensor 110 or the voice command, current context data including context data acquired using the voice command, and the plurality of data of different types included in the context data corresponding to the identified command for each corresponding type to identify whether the context data corresponding to the identified command has the similarity satisfying the second threshold value or more.

For example, the acquired current context data may include the current time data, temperature data, position data of the electronic apparatus 100, and position data of the user, acquired through the sensor 110. In this case, the processor 140 may acquire the similarity by comparing data on each of the current time, temperature, position of the electronic apparatus 100, and the position of the user, included in the acquired current context data, with data on each of the current time, temperature, position of the electronic apparatus 100, and the position of the user, included in the context data corresponding to the identified command for each type.

In this case, the processor 140 may acquire the similarity by performing the comparison only based on data of at least some types among the plurality of data of different types included in the context data. In addition, according to one or more embodiments, a weight value corresponding to each type of the plurality of data may be stored in the memory 120, and the weight value may have a different value based on the type. According to one or more embodiments, this configuration is described in detail with reference to FIG. 6.

Next, according to one or more embodiments, the method may include acquiring a control signal corresponding to the identified command (S350) in case that the current context data is identified as having the similarity satisfying the second threshold value or more with the stored context data corresponding to the identified command (Y). According to one or more embodiments, in case that the current context data is identified as having the similarity satisfying the second threshold value or more with the stored context data corresponding to the identified command "What time is it?", the processor 140 may acquire a control signal corresponding to a current time search command as the control signal corresponding to the identified "What time is it?".

Next, according to one or more embodiments, the method may include performing an operation based on the control signal (S360). According to one or more embodiments, the processor 140 may search for the current time based on a control signal corresponding to the acquired current time search command, and provide the user with data on the searched current time.

Accordingly, even when no separate call keyword is received, the electronic apparatus 100 may identify a command corresponding to the voice command by using the context data, and perform an operation corresponding thereto. As a result, user convenience may be increased.

FIG. 4 is a flowchart showing a method of acquiring the control signal corresponding to the command according to one or more embodiments.

Referring to FIG. 4, according to one or more embodiments, the method may include identifying the acquired text as first data in phoneme units (S410). According to one or more embodiments, in case that a text corresponding to "What teim is it?" is acquired, the processor 140 may identify the acquired "What teim is it?" as the first data in the phoneme units. The first data may be data on phonemes included in a text. Here, the data on the phonemes may also include data on an order of the respective phonemes included in the text.

Next, according to one or more embodiments, the method may include identifying the similarity in the phoneme units by comparing the identified first data with a plurality of second data in the phoneme units, each of the plurality of second data corresponding to a plurality of commands (S420). According to one or more embodiments, the second data in the phoneme units each corresponding to the plurality of commands may be stored in the memory 120. The processor 140 may identify the similarity in the phoneme units each corresponding to the commands stored in the memory 120 by comparing the first data corresponding to the acquired text "What teim is it?" with the second data in the phoneme units each corresponding to the plurality of commands stored in the memory 120.

According to one or more embodiments, the processor 140 may identify the similarity based on the number of phonemes matching the phonemes of the first data among a total number of phonemes each corresponding to the plurality of commands by comparing the first data in the identified phoneme units with the plurality of second data in the phoneme units each of the plurality of second data corresponding to the plurality of commands stored in the memory 120. In this case, the processor 140 may compare corresponding phonemes with each other based on the order of phonemes. For example, the processor 140 may acquire the similarity by comparing a plurality of phonemes including "t", "e", "i", and "m" included in the acquired text with at least one phoneme included in each of the plurality of commands.

Next, according to the one or more embodiments, the method may include identifying at least one command having the similarity of the first critical value or more in the phoneme units (S430). For example, the method may include identifying that a similarity value between the at least one command and the acquired text in phoneme units is greater than or equal to the first threshold value. According to one or more embodiments, the processor 140 may compare the phonemes included in the text with the phonemes included in each of the plurality of commands to identify the similarity in the phoneme units each corresponding to the plurality of commands, and identify at least one command whose identified similarity is the first critical value or more among the plurality of commands. For example, the processor 140 may identify "What time is it?" as a command having the similarity satisfying the first threshold value or more in the phoneme units with the acquired text "What time is it?". However, the disclosure is not limited to the above example, and the plurality of commands each having the first threshold value or more may be provided.

Next, according to one or more embodiments, the method may include identifying context data corresponding to at least one command (S440). According to one or more embodiments, the processor 140 may acquire the context data, e.g., state data of the electronic apparatus 100, position data of the electronic apparatus 100, the gender data of the utterer, and the position data of the user, corresponding to the identified command "What time is it?" based on the data stored in the memory 120.

Next, according to one or more embodiments, the method may include identifying context data having the similarity satisfying a second threshold value or more with the acquired current context data among the context data corresponding to at least one command (S450). According to one or more embodiments, the processor 140 may acquire the similarity by comparing the state data of the electronic apparatus 100, the position data of the electronic apparatus 100, the gender data of the utterer, and the position data of the user, acquired through the sensor 110, with the state data of the electronic apparatus 100, the position data of the electronic apparatus 100, the gender data of the utterer, and the position data of the user, corresponding to the command "What time is it?" for each corresponding type. Next, the processor 140 may identify the context data whose acquired similarity is the second critical value or more.

Next, according to one or more embodiments, the method may include identifying the command corresponding to the identified context data (S460). According to one or more embodiments, the processor 140 may identify a command corresponding to "What time is it?" from at least one command in case that the context data including the state data of the electronic apparatus 100, the position data of the electronic apparatus 100, the gender data of the utterer, and the position data of the user, which correspond to the command "What time is it?" is identified as having the similarity of the second critical value more with the context data including the acquired state data of the electronic apparatus 100, position data of the electronic apparatus 100, gender data of the utterer, and position data of the user.

Next, according to one or more embodiments, the method may include acquiring the control signal corresponding to the identified command (S470). According to one or more embodiments, the processor 140 may acquire a control signal corresponding to the current time search command as a control signal corresponding to the identified "What time is it?".

According to the above example, the electronic apparatus 100 may analyze the acquired text in the phoneme units to identify the control signal corresponding to the voice command, and then perform the operation based thereon. Accordingly, the electronic apparatus 100 may provide a service with high accuracy.

FIG. 5 is a diagram for explaining the command and the context data according to one or more embodiments.

According to one or more embodiments, the plurality of commands and the context data corresponding thereto may be stored in the memory 120.

According to one or more embodiments, the context data each corresponding to the commands may include the position data of the electronic apparatus 100, the state data of the electronic apparatus 100, the environment data of the electronic apparatus 100, and the context data of the user. However, the disclosure is not limited thereto, and may include intent data and priority data, corresponding to the command. The state data of the electronic apparatus may include operation state of the electronic apparatus.

According to one or more embodiments, in case that the voice command is received, the processor 140 may identify the command corresponding to the received voice command, and the processor 140 may identify the context data corresponding to the identified command based on the time in which the voice command is received. The processor 140 may store the identified command and the context data corresponding thereto in the memory 120.

In case that the voice command is input to the electronic apparatus 100 through the user or the like, the processor 140 may acquire the command and context data corresponding to the voice command and store the same in the memory 120 to thus update the command and the context data, stored in the memory 120. However the disclosure is not limited thereto, and as such, according to another embodiment, the processor 140 may acquire a voice command after a call keyword and context data corresponding to the voice command and store the command and the context data in the memory 120.

According to one or more embodiments, the position data of the electronic apparatus 100 may be data on a relative position of the electronic apparatus 100 in the driving space. Alternatively, the position data of the electronic apparatus 100 may be data on a subspace (e.g., an area or a region) where the electronic apparatus 100 is located among the plurality of subspaces (e.g., rooms) included in the driving space. The state data of the electronic apparatus 100 may be data on the remaining battery power of the electronic apparatus 100. The environment data of the electronic apparatus 100 may include the temperature data, the humidity data, and the fine dust concentration data, acquired from the sensor 110 included in the electronic apparatus 100, is not limited thereto, and may include the time data. In this case, the time data may indicate time data other than date data, for example, time data such as 6:00 pm or 8:30 am.

According to one or more embodiments, the context data of the user may include at least one of the gender data of the user, data on a movement path of the user, or data on the number of uses of the same command in a specific context, corresponding to an input voice command in case that the voice command is input.

In addition, according to one or more embodiments, the context data of the user may include intent data of the command and the priority data corresponding thereto. For example, the intent of the command may be any one of a control command, unknown intent, or chitchat (or simple conversation), but is not limited thereto. The priority data corresponding to the intent data may be, for example, first priority for the intent of the control command, second priority for the unknown intent, and third priority for the chitchat, but is not limited thereto.

Meanwhile, referring to FIG. 5, according to one or more embodiments, the plurality of commands and the context data including the plurality of data of different types corresponding thereto may be stored in the memory 120.

Here, FIG. 5 is a diagram showing the data stored in memory 120 for convenience of description. FIG. 5 shows that the context data including the plurality of data of different types are sequentially listed, which is provided for convenience of description, and an order of the plurality of data may be different based on a user setting or the like.

According to one or more embodiments, a lookup table 500 in which the plurality of commands and the context data corresponding the plurality of commands are mapped may be stored in the memory 120. However, the disclosure is not limited to a lookup table, and as such, according to another embodiment, the plurality of commands and the context data may be stored in a another manner. For example, according to another embodiment, the plurality of commands and the context data may be associated with each other in memory based various data storage methods. According to one or more embodiments, the command "What time is it?" and context data 510 including the plurality of data of different types corresponding thereto may be stored in the lookup table 500.

For example, the context data 510 including the command and the plurality of data of different types corresponding to the command may include the data on the number of uses, a type of subspace where the electronic apparatus is located, a classification based on voice characteristics of the utterer (e.g., the gender of the utterer), the utterance time, the movement path of the user, the temperature, the humidity, the fine dust, the intent, the priority, the remaining battery power, and the command, based on the left side of the drawing. Here "90" may indicate that the command "What time is it?" is used 90 times in the corresponding context. "ALL" may indicate that the commands are received in all the subspaces in the driving space. "Male" may indicate that the gender of the utterer is male. "12:00" may indicate time corresponding to the utterance time.

Meanwhile, "T201" may indicate the movement path of the user. "30°" may indicate a temperature corresponding to the utterance time, where the temperature may be in Celsius scale or Fahrenheit scale. "60%" may indicate humidity corresponding to the utterance time, and "H" may indicate a relative concentration (For example, at least one of high (H), medium (M), or low (L)) of the fine dust corresponding to the utterance time. "Intent-chitchat" may indicate that the intent corresponding to the command is "chitchat." "P 10" may indicate the priority. According to one or more embodiments, "P 10" may correspond to the third priority, and is not limited thereto. "B50%" may indicate that the remaining battery power of the electronic apparatus 100 corresponding to the utterance time is 50%.

According to one or more embodiments, the context data including the plurality of commands and the plurality of data of different types corresponding thereto may be mapped in the lookup table 500. The command "What time is it?" and the context data 510 corresponding thereto may be stored in the lookup table, and the command "Recommend the recipe" and context data 520 thereto may also be stored in the lookup table.

According to one or more embodiments, the processor 140 may identify the similarity of the context data by comparing each of the plurality of data with each of the plurality of data included in the context data corresponding to the command in case that the plurality of data of different types are included in the acquired current context data.

According to one or more embodiments, in case that the voice command corresponding to "Recommend the receipi" is received through the microphone 130, the processor 140 may acquire a text corresponding to "Recommend the receipi." The processor 140 may acquire the command corresponding to "Recommend the recipe" and the context data 520 corresponding thereto by comparing the text corresponding to "Recommend the receipi" with the plurality of commands included in the lookup table 500 stored in the memory 120.

Next, according to one or more embodiments, the processor 140 may acquire the similarity by comparing the context data acquired through the sensor 110 with the context data 520 corresponding to the command "Recommend the recipe." However, the disclosure is not limited thereto, and according to one or more embodiments, the processor 140 may acquire the context data by using the received voice command. The method of acquiring the similarity of the context data is described in detail with reference to FIG. 6.

Figure 6:
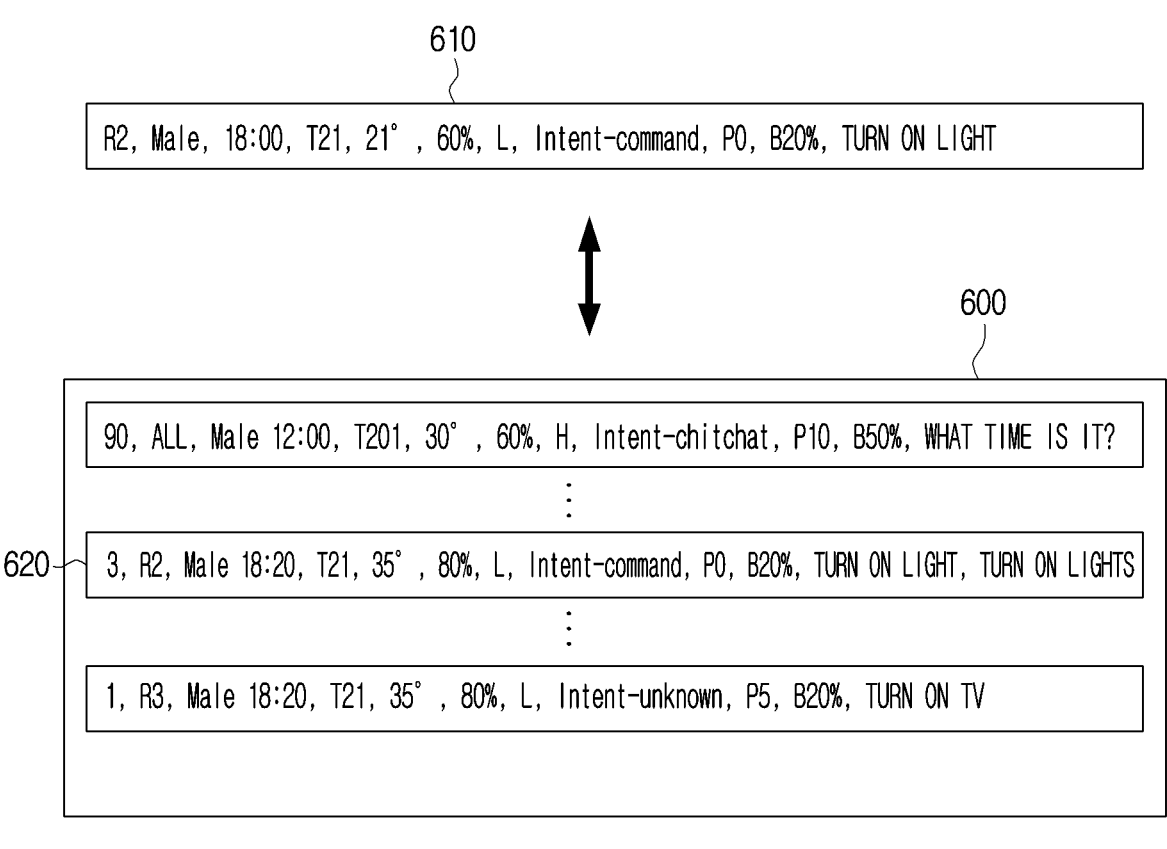
FIG. 6 is a diagram for explaining a method of identifying similarity of context data according to one or more embodiments.

FIG. 6 is a diagram for explaining the method of identifying the similarity of the context data according to one or more embodiments.

Referring to FIG. 6, according to one or more embodiments, the processor 140 may acquire the current context data and identify the similarity of the stored context data stored in the memory 120 based on the acquired current context data. According to one or more embodiments, the processor 140 may acquire the context data through the sensor 110, is not limited thereto, and may acquire the context data by using the received voice command.

According to one or more embodiments, the voice command corresponding to "Turn on the light" may be received, and the command "Turn on the light" and context data 620 corresponding thereto may be identified based thereon.

According to one or more embodiments, the processor 140 may first acquire context data 610 at time in which the voice command is received through the sensor 110. For example, the voice command corresponding to "Turn on the light" may be received. The processor 140 may identify that the electronic apparatus 100 is located in a subspace "R2" through the sensor 110, identify the utterance time as "18:00", identify the movement path of the user as "T21", identify the temperature corresponding to the utterance time as "21°", identify the humidity corresponding to the utterance time as "60%"; identify the relative concentration of the fine dust corresponding to the utterance time as "L", identify the data on the remaining battery power as "B20%" as the remaining battery power of the electronic apparatus 100 corresponding to the utterance time is 20%. In addition, the processor 140 may acquire "Male" as the gender data by identifying that the gender of the utterer is male by using the received voice command, and identify "Intent-command" as the intent data by identifying the intent of the user as the control command based on the text corresponding to the voice command. In addition, the processor may identify "P0" as priority corresponding to the identified intent data.

According to one or more embodiments, "P0" may correspond to the first priority, and is not limited thereto.

Next, according to one or more embodiments, the processor 140 may acquire the similarity by comparing the plurality of data of different types included in the acquired current context data 610 with the plurality of data of different types included in the context data 620 corresponding to the command "Turn on the light" for each corresponding type.

For example, the processor 140 may compare the plurality of data of different types included in the context data with each other, and acquire the similarity corresponding to each of the plurality of data of different types, and identify an average value of the similarity corresponding to each of the different acquired types as the similarity of the context data corresponding to the command "Turn on the light."

Alternatively, according to one or more embodiments, the processor 140 may identify a weight corresponding to each type of the plurality of data, and identify the similarity of the context data based on the identified weight. For example, the weight value corresponding to each type of the plurality of data may be pre-stored in the memory 120. The processor 140 may compare the plurality of data of different types included in the current context data 610 with the plurality of data of different types included in the context data 620 corresponding to the command "Turn on the light", respectively, to acquire similarity corresponding to each of the plurality of data of different types (e.g., position of the subspace, gender of the user, or time), and then acquire similarity of the context data 620 corresponding to "Turn on the light" by multiplying the similarity corresponding to each of the plurality of data obtained by the weight value corresponding to each similarity.

Figure 7A:
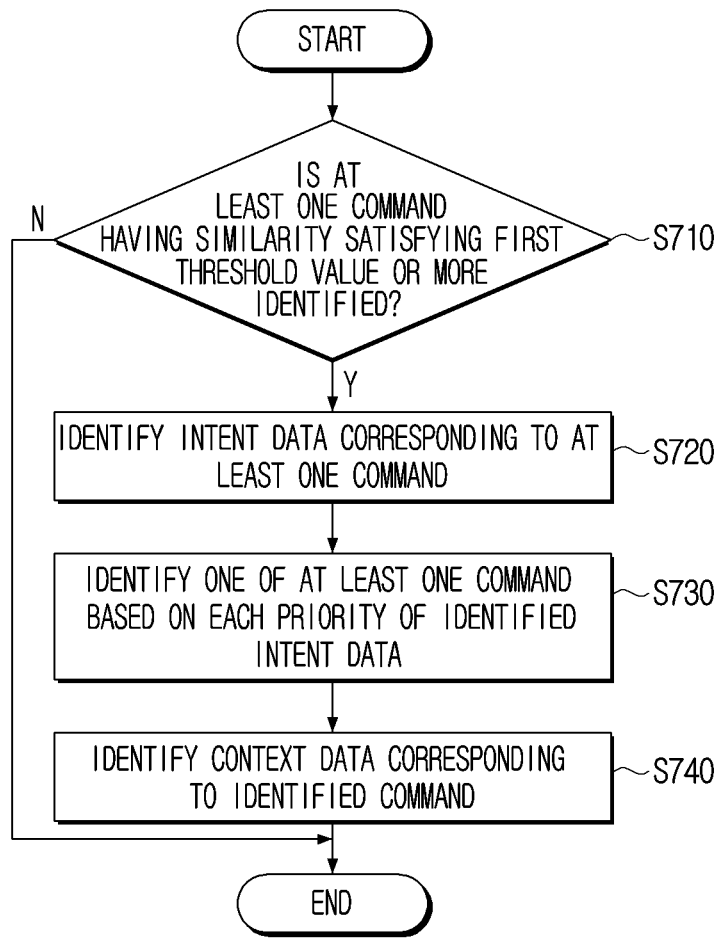
FIG. 7A is a flowchart for explaining a method of identifying context data based on intent data according to one or more embodiments.
Figure 7B:
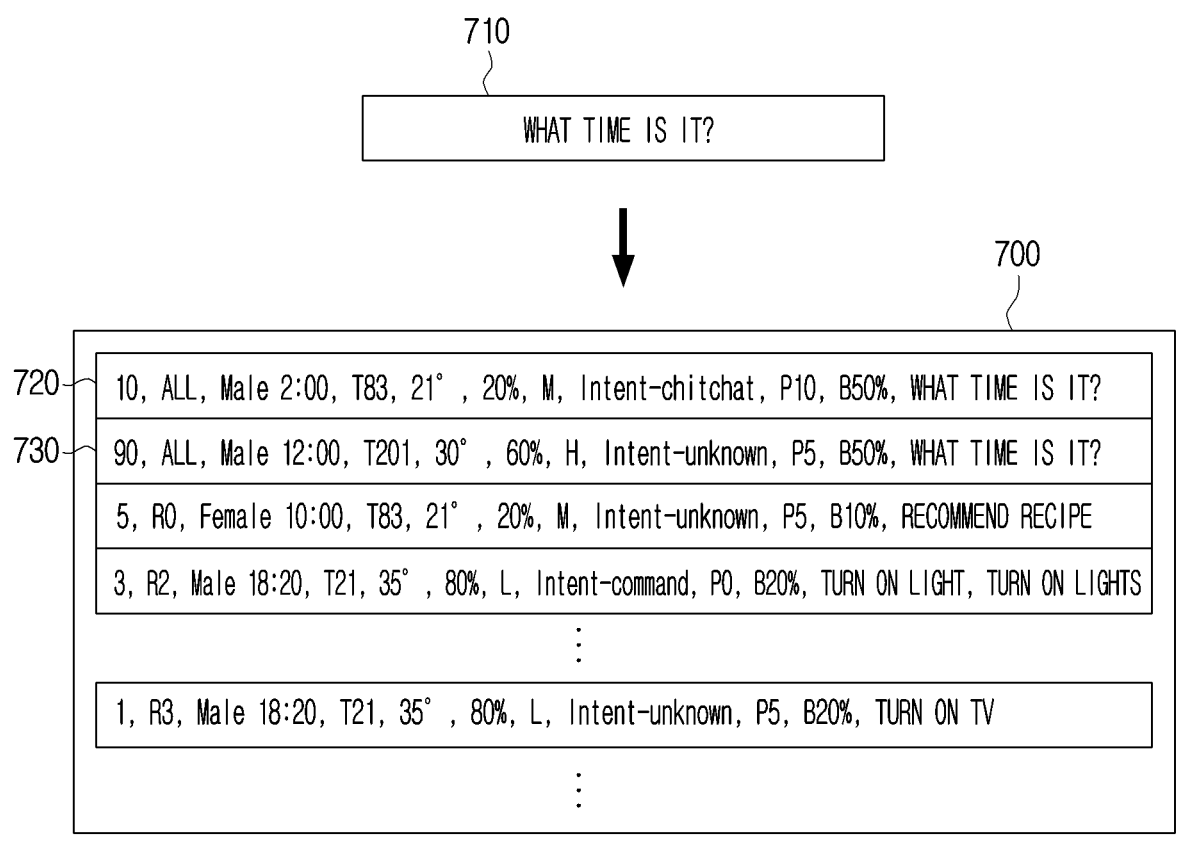
FIG. 7B is a diagram for explaining a method of identifying context data based on intent data according to one or more embodiments.

FIG. 7A is a for explaining a method of identifying context data based on intent data according to one or more embodiments, and FIG. 7B is a diagram for explaining a method of identifying context data based on intent data according to one or more embodiments.

Referring to FIGS. 7A and 7B, according to one or more embodiments, the method may include identifying whether at least one command having the similarity of the first critical value or more exists (S710). Referring to FIG. 7B, a plurality of context data corresponding to the command of the same text may be stored in the memory 120. For example, a plurality of context data 720 and 730 having different values corresponding to the command "What time is it?" may be stored. According to one or more embodiments, in case that a voice command 710 corresponding to "What time is it?" is received, the processor 140 may identify a first command and a second command, having the similarity of the first threshold value or more with a text corresponding to the voice command, based on a lookup table 700 stored in the memory 120.

Next, according to one or more embodiments, in case that at least one command having the similarity satisfying the first threshold value or more is identified (Y), the method may include identifying intent data corresponding to each of the at least one command (S720). According to one or more embodiments, the intent of the command may be any one of the control command, the unknown intent, or the chitchat (or the simple conversation), and is not limited thereto. The priority data corresponding to the intent data may be, for example, the first priority (or "P0") for the intent of the control command, the second priority (or "P5") for the unknown intent, and the third priority (or "P10") for the chitchat, and is not limited thereto.

According to one or more embodiments, the processor 140 may identify the intent data each corresponding to the identified first command and second command based on the context data each corresponding to the commands stored in the memory 120. For example, the processor 140 may identify the context data 720 (or first context data) corresponding to the identified first command and the context data 730 (or second context data) corresponding to the second command among the context data each corresponding to the plurality of commands mapped in the lookup table 700 stored in the memory 120. Next, the processor 140 may identify "Intent-chitchat" and "Intent-unknown", respectively, by the intent data included in the context data 720 corresponding to the identified first command and the context data 730 corresponding to the second command.

Next, according to one or more embodiments, the method may include identifying one of at least one command based on each priority of the identified intent data (S730). According to one or more embodiments, the processor 140 may identify, as "P5" and "P10", the priority data each corresponding to "Intent-chitchat" and "Intent-unknown", which are the intent data included in the first context data 720 corresponding to the identified first command and the second context data 730 corresponding to the identified second command, and identify the second command corresponding to the second context data 730 having higher priority among the commands.

Next, according to one or more embodiments, the control method may include identifying the context data corresponding to the identified command (S740). According to one or more embodiments, the processor 140 may identify the second context data 730 corresponding to the second command.

Figure 8:
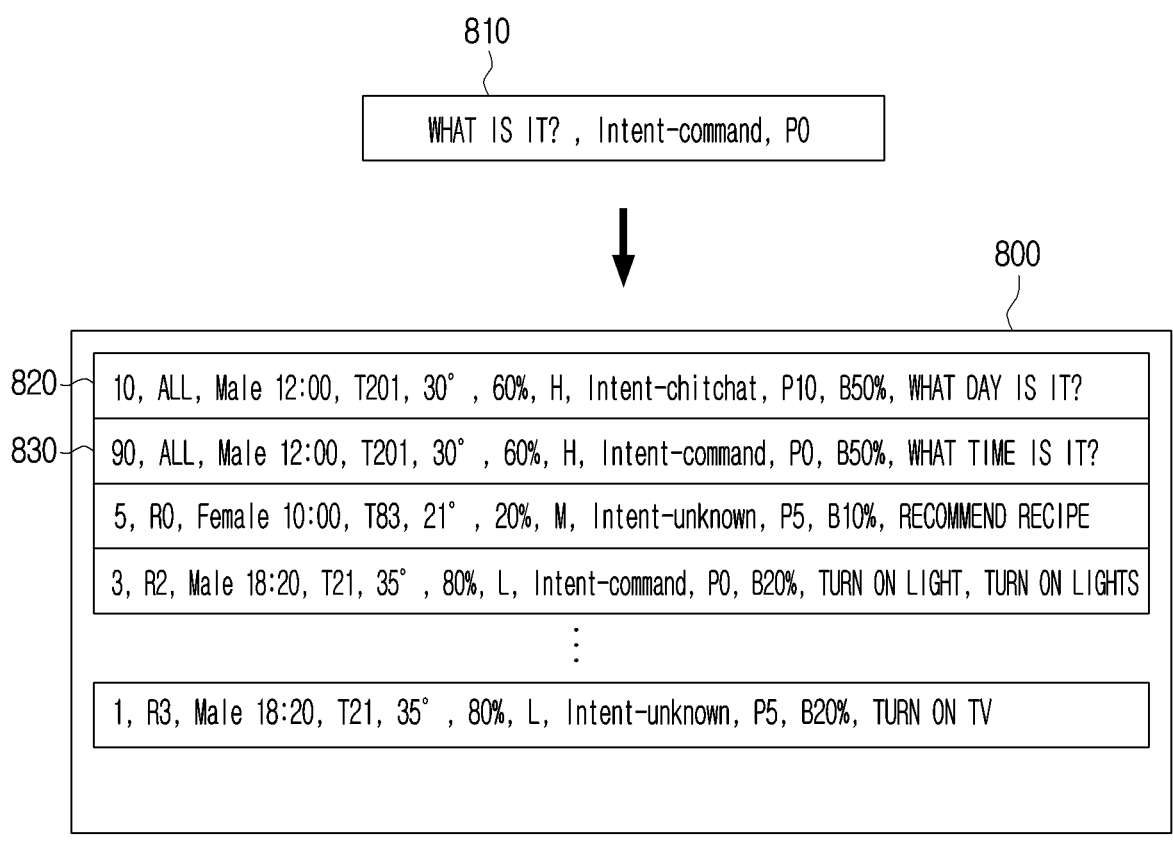
FIG. 8 is a diagram for explaining a method of identifying a command based on intent data for each word according to one or more embodiments.

FIG. 8 is a diagram for explaining a method of identifying the command based on the intent data for each phrase according to one or more embodiments.

Referring to FIG. 8, according to one or more embodiments, the processor 140 may identify one of the commands stored in the memory 120 based on a phrase (or a text) corresponding to the voice command and the intent data therefor.

According to one or more embodiments, the context data including the phrase included in each of the plurality of commands and the intent data for each phrase may be stored in the memory 120. For example, first context data 820 including a phrase (or a text) corresponding to "What day is it?" and "Intent-chitchat" which is first intent data corresponding thereto may be stored in the memory 120. In addition, second context data 820 including a phrase (or a text) corresponding to "What time is it?" and "Intent-command" which is second intent data corresponding thereto may be stored in the memory 120.

According to one or more embodiments, the processor 140 may acquire the phrase and intent data corresponding to the voice command in case that the acquired current context data is identified as having the similarity satisfying the second threshold value or more with the stored context data corresponding to at least one command.

For example, the processor 140 may first identify an acquired text "What is it?" and the command "What day is it?" and "What time is it?", each having the similarity satisfying the first threshold value or more. Next, the processor 140 may identify the context data having the similarity satisfying the second threshold value or more with the acquired current context data among the identified commands based on the data stored in the memory 120. In this case, the processor 140 may identify that each of the first context data 820 and the second context data 830 has the similarity satisfying the second threshold value or more. Next, as the plurality of context data 820 and 830 having the similarity satisfying the second threshold value or more with the current context data is identified, the processor 140 may acquire a phrase corresponding to the voice command "What is it?" and "Intent-command" which is intent data corresponding thereto. Meanwhile, the processor 140 may also acquire intent data including the priority data "P0" corresponding to the intent data "Intent-command." That is, the processor 140 may acquire a plurality of data 810 including the intent data and the priority data corresponding to the intent data.

Next, according to one or more embodiments, the processor 140 may identify one of at least one command by comparing the acquired phrase and intent data with the intent data for each phrase corresponding to each of the plurality of commands stored in the memory 120. For example, the processor 140 may compare "Intent-command" which is the intent data corresponding to the acquired "What is it?" with the intent data included in each of the first context data 820 and the second context data 830 to identify "Intent-command" which is the intent data corresponding to phrase "What is it?" in the acquired text from the voice command and the phrase "What time is it?" which is the command corresponding to the second context data including the same intent data.

Accordingly, in case that a command may be interpreted as the plurality of commands, such as "What is it?", the electronic apparatus 100 may identify the user command by using the intent of the user that is included in the voice command. Accordingly, the electronic apparatus 100 may thus provide the response with the higher accuracy.

Meanwhile, returning to FIG. 2, according to one or more embodiments, the processor 140 may delete at least one of the plurality of commands from the memory 120 based on at least one of the use history or priority of the plurality of commands stored in the memory 120. According to one or more embodiments, the processor 140 may delete identified any one command and context data corresponding thereto from the memory 120 in case that the number of uses is identified as less than a predetermined value based on the use history of any one of the plurality of commands. Alternatively, the processor 140 may delete a command having the lowest priority and context data corresponding thereto, based on the data on the priorities of the plurality of commands.

Figure 9:
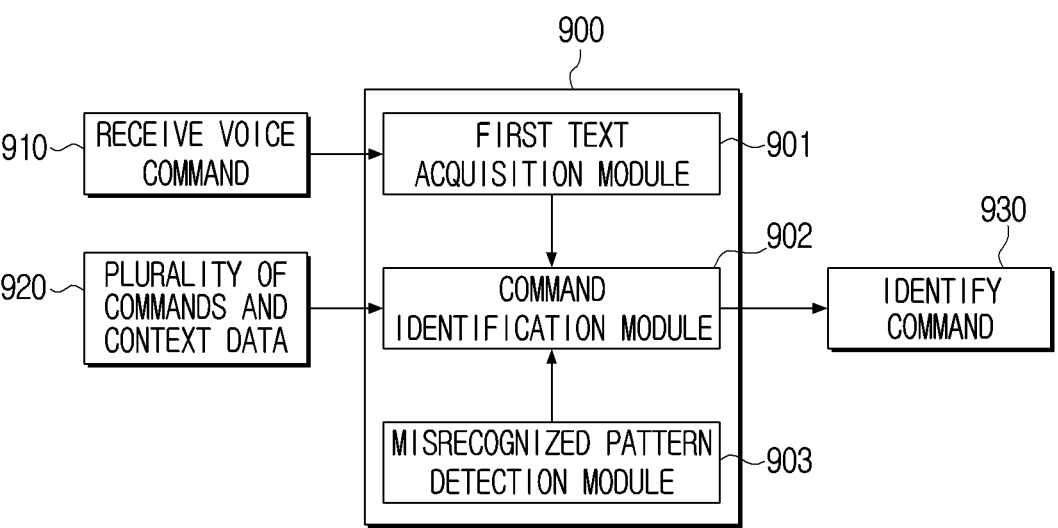
FIG. 9 is a block diagram for explaining a first speech recognition module according to one or more embodiments.

FIG. 9 is a block diagram for explaining a first speech recognition module according to one or more embodiments.

According to one or more embodiments, the processor 140 may identify a command corresponding to the acquired text among the plurality of commands stored in the memory 120 by using the first speech recognition module.

According to FIG. 9, according to one or more embodiments, the first speech recognition module 900 may include a first text acquisition module 901, a command identification module 902, and a misrecognized pattern detection module 903. Here, the first speech recognition module 900 may be implemented as a learning neural network model and pre-stored in the memory 120. Meanwhile, according to one or more embodiments, the first speech recognition module 900 may be a module that acquires a text corresponding to a voice in word units.

According to one or more embodiments, in case that the voice command (910) is received through the microphone 130, the processor 140 may input the received voice command to the first speech recognition module 900. The first speech recognition module 900 may acquire the text corresponding to the voice command by inputting the input voice command to the first text acquisition module 901.

Meanwhile, according to one or more embodiments, the command identification module 902 may identify a command corresponding to the acquired text (930) based on the plurality of commands and the context data corresponding thereto stored in the memory 120 (920). For example, the command identification module 902 may identify the context data corresponding to the identified command in case that the command having the similarity of the first threshold value or more with the acquired text is identified among the plurality of commands stored in the memory 120, and identify the current context data as the command corresponding to the acquired text in case that the acquired current context data is identified as having the similarity of the second threshold value or more with the context data corresponding to the identified command.

Meanwhile, the misrecognized pattern detection module 903 may be a module that identifies a text having similarity of a predetermined value or more with each of the plurality of commands stored in the memory 120 or detects (or identifies) a text identified as the same command as the command. According to one or more embodiments, the misrecognized pattern detection module 903 may identify, as "What time is it?" in case that a text "What times it?" similar to "What time is it?" is input. Alternatively, the misrecognized pattern detection module may identify, as "Tell me the current time" in case that "Tell me the current time" identified as the same command as "What time is it?" is input.

Meanwhile, according to one or more embodiments, the processor 140 may update the memory 120 to include data on the identified text in case that the command corresponding to the text having the similarity of the predetermined value or more with each of the plurality of commands stored through the misrecognition pattern detection module 903 or the text which is the same command as each of the plurality of commands is identified.

For example, the command corresponding to the text having the similarity of the predetermined value or more with a text of the first command may be identified. Here, the identified command is received, the processor 140 may store data for identifying the identified command as the first command in the memory 120. Alternatively, according to one or more embodiments, the processor 140 may identify a command including a text identified as the same command as the first command, and update the memory 120 for data on the identified command to be included in data on the first command. The processor 140 may identify an identified command as the first command in case that the identified command is received.

Figure 10:
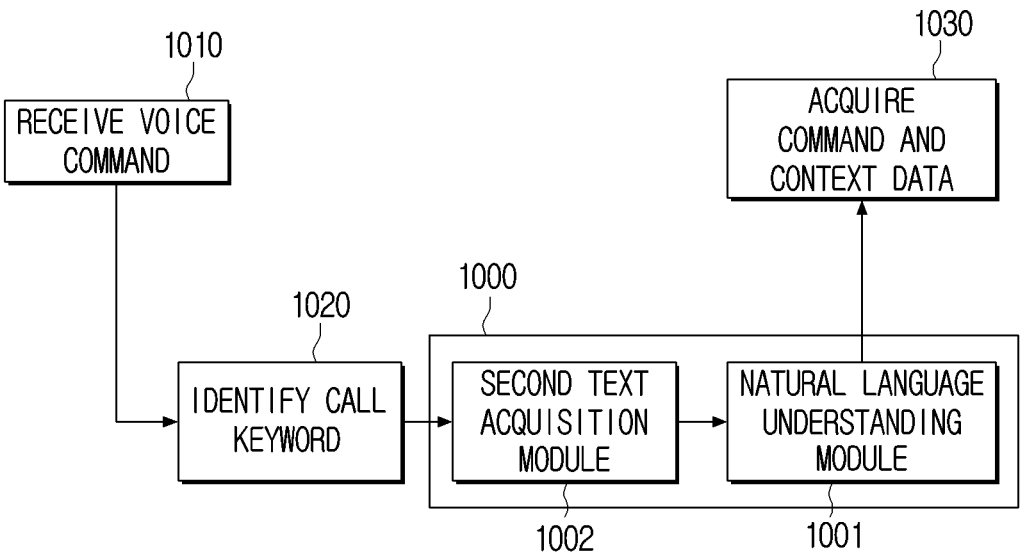
FIG. 10 is a block diagram for explaining a second speech recognition module according to one or more embodiments.

FIG. 10 is a block diagram for explaining a second speech recognition module according to one or more embodiments.

According to one or more embodiments, the processor 140 may acquire the command corresponding to the user voice command by using the second speech recognition module to store the acquired command and context data corresponding to the acquired command in the memory 120. That is, the second speech recognition module may update the context data stored in the memory 120.

According to FIG. 10, according to one or more embodiments, the processor 140 may first receive the voice command (1010). Next, according to one or more embodiments, the processor 140 may identify the call keyword in case that the call keyword is included in the voice command (1020).

Meanwhile, according to one or more embodiments, a second speech recognition module 1000 may include a second text acquisition module 1002 and a natural language understanding module 1001. Here, the second text acquisition module 1002 may be a module that outputs a text corresponding to the acquired voice command, and implemented as a learning neural network model. Meanwhile, according to one or more embodiments, the second text acquisition module 1002 may be a module different from the first text acquisition module 901, and the second text acquisition module 1002 may receive the voice in conversational units and acquire the same as a text.

Meanwhile, the natural language understanding module 1001 may identify the request of the user that includes the intent of the user by applying the acquired text to a natural language understanding algorithm. The second speech recognition module 1000 may store the identified request of the user in the memory 120 in case that the request of the user that includes the acquired text and the intent data of the user that corresponds thereto is identified. Meanwhile, according to one or more embodiments, the processor 140 may acquire the text and the corresponding context data, acquired through the second speech recognition module 1000, along with the request of the user corresponding thereto, and stores the same in the memory 120. For example, in case that a voice command is received, the processor 140 may acquire the context data based on the sensor 110 or the received voice command, and acquire the text corresponding to the voice command and the corresponding intent data of the user, received through the second speech recognition module 1000. The processor 140 may store the acquired context data, the acquired text, and the corresponding intent data (1030) of the user in the memory 120.

Meanwhile, according to one or more embodiments, the processor 140 may perform the speech recognition on the voice command by using the second speech recognition module in case that the command having the similarity satisfying the first threshold value or more with the acquired text is not identified using the first speech recognition module. According to one or more embodiments, the processor 140 may acquire the text corresponding to the voice command by performing the speech recognition on the voice command by using the second speech recognition module 1000 in case that the command having the similarity satisfying the first threshold value or more is not identified even though the first speech recognition module 900 is used to identify the similarity between the acquired text and the plurality of commands stored in the memory 120. Next, according to one or more embodiments, the processor 140 may identify the command having the similarity satisfying the first threshold value or more by comparing the acquired text with the data stored in the memory 120 by using the second speech recognition module 1000.

Figure 11:
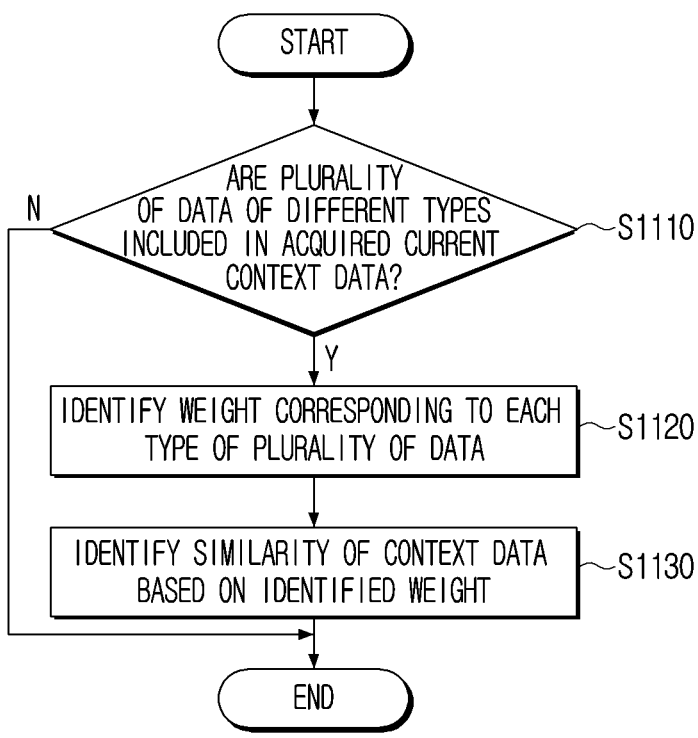
FIG. 11 is a flowchart for explaining a method of identifying the similarity in consideration of a weight corresponding to a data type according to one or more embodiments.

FIG. 11 is a flowchart for explaining a method of identifying the similarity in consideration of the weight corresponding to a data type according to one or more embodiments.

According to FIG. 11, according to one or more embodiments, the method may first include identifying whether a plurality of data of different types are included in the acquired current context data (S1110).

Next, according to one or more embodiments, the method may include identifying the weight corresponding to each type of the plurality of data (S1120) in case that the plurality of data of different types are included in the acquired current context data (Y). According to one or more embodiments, the processor 140 may acquire the state data of the electronic apparatus 100 through the sensor 110, for example, the data on the remaining battery power of the electronic apparatus 100. Alternatively, according to one or more embodiments, the processor 140 may acquire the environmental data of the electronic apparatus 100 through the sensor 110, for example, the data on at least one of the temperature, the humidity, the illumination, the fine dust concentration, or the current time. Alternatively, according to one or more embodiments, the processor 140 may acquire the context data of the user, for example, the data on the gender of the user or the position of the user. In this case, the processor 140 may identify the weight corresponding to each type of the plurality of data based on the data stored in the memory 120.

Next, according to one or more embodiments, the method may include identifying the similarity of the context data based on the identified weight (S1130). According to one or more embodiments, the processor 140 may identify the weight corresponding to each of the plurality of data based on the data stored in the memory 120. In this case, the processor 140 may compare the plurality of data of different types included in the current context data and the plurality of data of different types included in the context data corresponding to the command, respectively, to identify the similarity corresponding to each of the plurality of data of different types (e.g., position of the subspace, gender of the utterer, or time corresponding to the utterance time), and identify the similarity of the context data each corresponding to the plurality of commands by multiplying the similarity corresponding to each of the plurality of identified data by the weight value corresponding to each similarity.

Figure 12:
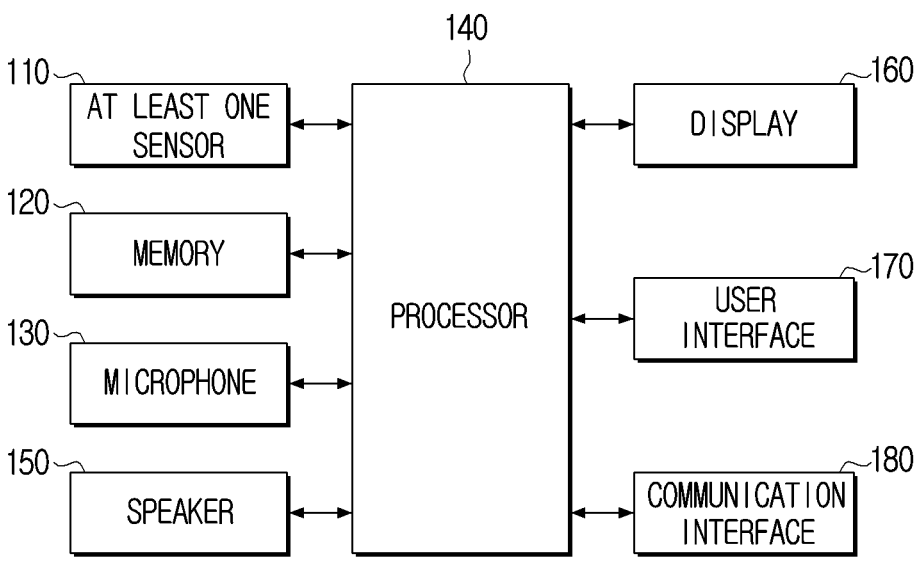
FIG. 12 is a block diagram showing a detailed configuration of an electronic apparatus according to one or more embodiments.

FIG. 12 is a block diagram showing a detailed configuration of an electronic apparatus according to one or more embodiments.

Referring to FIG. 12, an electronic apparatus 100' may include sensor 110, a memory 120, a microphone 130, a processor 140, a speaker 150, a display 160, a user interface 170, and a communication interface 180. The description omits detailed descriptions of components overlapping the components shown in FIG. 2 among the components shown in FIG. 12.

The speaker 150 may include a tweeter for high-pitched audio playback, a midrange for mid-range audio playback, a woofer for low-pitched audio playback, a subwoofer for extremely low-pitched audio playback, an enclosure for controlling resonance, a crossover network that divides a frequency of the electrical signal input to the speaker for each band, or the like.

The speaker 150 may output the audio signal to the outside of the electronic apparatus 100'. The speaker 150 may output multimedia playback, recording playback, various notification sounds, voice messages, or the like. The electronic apparatus 100' may include an audio output device such as the speaker 150, or an output device such as an audio output terminal. In particular, the speaker 150 may provide acquired data, processed/produced information based on the acquired data, a response result to the user voice, an operation result to the user voice, or the like, in a form of the voice.

The display 160 may be implemented as a display including a self-light emitting element or a display including a non self-light emitting element and a backlight. For example, the display may be implemented in various types of displays such as a liquid crystal display (LCD), an organic light emitting diode (OLED) display, a light emitting diode (LED) display, a micro light emitting diode (micro LED) display, a mini LED display, a plasma display panel (PDP), a quantum dot (QD) display, a quantum dot light-emitting diode (QLED) display. The display 160 may also include a driving circuit, a backlight unit, or the like, which may be implemented in a form such as an a-si thin film transistor (TFT), a low temperature poly silicon (LTPS) TFT, or an organic TFT (OTFT). Meanwhile, the display 160 may be implemented as a touch screen combined with a touch sensor, a flexible display, a rollable display, a three-dimensional (3D) display, a display in which a plurality of display modules are physically connected with each other, or the like. The processor 140 may control the display 160 to output an acquired output image according to various embodiments described above. Here, the output image may be a high-resolution image of 4K, 8K or higher.

The user interface 170 is a component for the electronic apparatus 100' to perform interaction with the user. For example, the user interface 170 may include at least one of a touch sensor, a motion sensor, a button, a jog dial, a switch, a microphone, or a speaker, and is not limited thereto.

The communication interface 180 may input and output various types of data. For example, the communication interface 180 may receive and transmit the various types of data from an external device (e.g., source device), an external storage medium (e.g., universal serial bus (USB) memory), an external server (e.g., web hard), or the like by using a communication method such as an access point (AP) based wireless fidelity (Wi-Fi, i.e., wireless local area network (LAN)), a Bluetooth, a Zigbee, a wired/wireless local area network (LAN), a wide area network (WAN), Ethernet, an IEEE 1394, a high definition multimedia interface (HDMI), a USB, a mobile high-definition link (MHL), an audio engineering society/European broadcasting union (AES/EBU) communication, an optical communication or a coaxial communication.

According to the various embodiments described above, the electronic apparatus may identify the command corresponding to the voice command by using the context data even though no separate call keyword is received in case that the voice command is received, and perform the operation corresponding thereto. Accordingly, the electronic apparatus may provide a prompt service in response to the request of the user for performing the simple operation.

Meanwhile, the methods according to the various embodiments of the disclosure described above may be implemented in the form of applications which may be installed in an electronic apparatus. Alternatively, the methods according to the various embodiments of the disclosure described above may be performed using a deep learning-based learning neural network (or deep-learning neural network), that is, the learning network model. In addition, the methods according to the various embodiments of the disclosure described above may be implemented only by software upgrade or hardware upgrade for the electronic apparatus. In addition, the various embodiments of the disclosure described above may be performed through an embedded server disposed in the electronic apparatus, or a server disposed outside the electronic apparatus.

Meanwhile, according to one or more embodiments of the disclosure, the various embodiments described above may be implemented by software including an instruction stored in a machine-readable storage medium (according to one or more embodiments, a computer-readable storage medium). A machine may be an apparatus that invokes the stored instruction from the storage medium and may be operated based on the invoked instruction, and may include a display device (e.g., display device A) according to the disclosed embodiments. In case that the instruction is executed by the processor, the processor may directly perform a function corresponding to the instruction or other components may perform the function corresponding to the instruction under control of the processor. The instruction may include codes provided or executed by a compiler or an interpreter. The machine-readable storage medium may be provided in the form of a non-transitory storage medium. Here, the term "non-transitory" indicates that the storage medium is tangible without including a signal, and does not distinguish whether data are semi-permanently or temporarily stored in the storage medium.

In addition, according to one or more embodiments, the methods according to the various embodiments described above may be included and provided in a computer program product. The computer program product may be traded as a product between a seller and a purchaser. The computer program product may be distributed in a form of the machine-readable storage medium (according to one or more embodiments, a compact disc read only memory (CD-ROM)) or online through an application store (according to one or more embodiments, PlayStore™). In case of the online distribution, at least a part of the computer program product may be at least temporarily stored or temporarily provided in a storage medium such as a memory of a server of a manufacturer, a server of an application store or a relay server.

In addition, each of the components (according to one or more embodiments, modules or programs) according to the various embodiments described above may include a single entity or a plurality of entities, and some of the corresponding sub-components described above may be omitted or other sub-components may be further included in the various embodiments. Alternatively or additionally, some of the components (according to one or more embodiments, the modules or the programs) may be integrated into one entity, and may perform functions performed by the respective corresponding components before being integrated in the same or similar manner. Operations performed by the modules, the programs or other components according to the various embodiments may be executed in a sequential manner, a parallel manner, an iterative manner or a heuristic manner, at least some of the operations may be performed in a different order or be omitted, or other operations may be added.

Although the embodiments of the disclosure are shown and described hereinabove, the disclosure is not limited to the above-mentioned specific embodiments, and may be variously modified by those skilled in the art to which the disclosure pertains without departing from the scope and spirit of the disclosure as disclosed in the accompanying claims. These modifications also need to be understood to fall within the scope of the disclosure.

What is claimed is:

1. An apparatus comprising: at least one sensor; a memory storing a plurality of context data each corresponding to one of a plurality of commands; a microphone; and at least one processor configured to: acquire text data corresponding to a voice command received through the microphone, identify at least one candidate command, among the plurality of commands, based on a comparison between the acquired text data and the plurality of commands, identify a first command, among the at least one candidate command based on intent data corresponding to each of the at least one candidate command, each of the intent data indicating an intent of the user corresponding to the respective candidate command, identify first context data, among the plurality of context data, corresponding to the identified first command, acquire a control signal corresponding to the identified first command based on a comparison between the first context data corresponding to the identified first command and second context data acquired through the at least one sensor corresponding to the voice command, and perform an operation based on the control signal.

2. The apparatus as claimed in claim 1, wherein the at least one processor is further configured to identify the acquired text data as first data in phoneme units, identify a plurality of similarity values, each corresponding to a level of similarity between the acquired text data and a respective one of the plurality of commands by comparing the identified first data with second data in the phoneme units corresponding to each the plurality of commands, and identify the first command based on a first similarity value, corresponding to the level of similarity between the acquired text data and the first command, being greater than or equal to a first threshold value.

3. The apparatus as claimed in claim 2, wherein the at least one processor is configured to:

identify the first context data based on the first context data having a second similarity value, corresponding to a level of similarity between the first context data and the second context data, being greater than or equal to a second threshold value.

4. The apparatus as claimed in claim 3, wherein the memory stores text information for each of the plurality of commands and intent data corresponding to the plurality of commands, and wherein the at least one processor is further configured to:

acquire the intent data corresponding to the voice command when the second context data is identified as having the similarity satisfying the second threshold value or more with first context data corresponding to the first command, and identify the first command by comparing the acquired intent data with the intent data for each text corresponding to each of the plurality of commands stored in the memory.

5. The apparatus as claimed in claim 2, wherein the at least one processor is further configured to:

identify the first command corresponding to the acquired text data among the plurality of commands stored in the memory based on a first speech recognition module, and acquire a second command corresponding to the voice command based on a second speech recognition module to store the acquired second command and context data corresponding to the acquired second command in the memory.

6. The apparatus as claimed in claim 5, wherein the at least one processor is further configured to perform speech recognition on the voice command based on the second speech recognition module in case that the command having the similarity satisfying the first threshold value or more with the acquired text is not identified based on the first speech recognition module.

7. The apparatus as claimed in claim 1, wherein the first context data and the second context data comprise a plurality of types of data comprising at least one of position data of the electronic apparatus, state data of the electronic apparatus, environment data of the electronic apparatus, or context data of a user, and wherein the at least one processor is further configured to identify similarity between the first context data and the second context data by comparing each of the plurality of types of data included in the first context data with each of the plurality of types of data included in the second context data.

8. The apparatus as claimed in claim 1, wherein the at least one processor is further configured to:

identify the first command further based on a priority associated with each of the intent data corresponding to each of the at least one commands.

9. The apparatus as claimed in claim 1, wherein the at least one processor is further configured to delete at least one of the plurality of commands from the memory based on at least one of use history or priority of the plurality of commands stored in the memory.

10. The apparatus as claimed in claim 1, wherein the at least one processor is further configured to:

identify a weight corresponding to each type of a plurality of data of different types included in the second context data, and identify similarity between the first context data and the second context data based on the identified weight.

11. The apparatus as claimed in claim 1, wherein the at least one processor is further configured to:

identify the first command by comparing the acquired text data in phoneme units with second data in the phoneme units corresponding to each the plurality of commands.

12. A method for controlling an electronic apparatus which performs speech recognition, the method comprising:

acquiring text data corresponding to a voice command;

identifying at least one candidate command, among a plurality of commands, based on a comparison between the acquired text data and the plurality of commands;

identifying a first command, among the at least one candidate command based on intent data corresponding to each of the at least one candidate command, each of the intent data indicating an intent of the user corresponding to the respective candidate command;

identifying first context data, among a plurality of context data, corresponding to the identified first command, each of the plurality of context data corresponding to one of a plurality of commands;

acquiring a control signal corresponding to the identified first command based on a comparison between the first context data corresponding to the identified first command and second context data acquired through at least one sensor corresponding to the voice command; and performing an operation based on the control signal.

13. The method as claimed in claim 12, wherein the identifying of the first command comprises:

identifying the acquired text data as first data in phoneme units;

identifying a plurality of similarity values, each corresponding to a level of similarity between the acquired text data and a respective one of the plurality of commands by comparing the identified first data with second data in the phoneme units corresponding to each the plurality of commands, and identifying the first command based on a first similarity value corresponding to the level of similarity between the acquired text data and the first command being greater than or equal to a first threshold value.

14. The method as claimed in claim 13, wherein the acquiring first context data comprises:

identifying the first context data based on the first context data having a second similarity value corresponding to a level of similarity between the first context data and the second context data being greater than or equal to a second threshold value.

15. The method as claimed in claim 12, wherein the first context data and the second context data comprise a plurality of types of data comprising at least one of position data of the electronic apparatus, state data of the electronic apparatus, environment data of the electronic apparatus, or context data of a user, and wherein the method further comprises:

identifying similarity between the first context data and the second context data by comparing each of the plurality of data included in the first context data with each of the plurality of data included in the second context data.

16. The method as claimed in claim 12, wherein the identifying of the first command comprises:

identifying the first command further based on a priority associated with each of the intent data corresponding to each of the plurality of commands.

17. The method as claimed in claim 12, wherein the first command is identifying by comparing the acquired text data in phoneme units with second data in the phoneme units corresponding to each the plurality of commands.

* * * * *